United States Patent
Lee

(10) Patent No.: US 9,821,842 B2
(45) Date of Patent: Nov. 21, 2017

(54) REAR WHEEL STEERING SYSTEM AND CONTROL METHOD THEREOF

(71) Applicant: HYUNDAI MOBIS CO., LTD., Seoul (KR)

(72) Inventor: Jeong Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 91 days.

(21) Appl. No.: 14/885,042

(22) Filed: Oct. 16, 2015

(65) Prior Publication Data

US 2016/0107683 A1 Apr. 21, 2016

(30) Foreign Application Priority Data

Oct. 17, 2014 (KR) .................. 10-2014-0140671

(51) Int. Cl.
*B62D 7/15* (2006.01)
(52) U.S. Cl.
CPC .................. *B62D 7/159* (2013.01)
(58) Field of Classification Search
CPC .................................... B62D 7/159
See application file for complete search history.

(56) References Cited

U.S. PATENT DOCUMENTS

2012/0277956 A1* 11/2012 Sasaki .................... B62D 7/159
701/41

FOREIGN PATENT DOCUMENTS

JP          5-77754 A      3/1993
KR   10-2014-0073262 A    6/2014

OTHER PUBLICATIONS

Chinese Office Action dated May 19, 2017 of corresponding Chinese Patent Application No. 201510653907.2—5 pages.

* cited by examiner

*Primary Examiner* — Basil T. Jos
(74) *Attorney, Agent, or Firm* — Knobbe Martens Olson & Bear LLP

(57) ABSTRACT

A rear wheel steering system may include: a vehicle speed detection unit configured to detect a vehicle speed; a steering angle detection unit configured to detect a steering angle based on an operation of a steering wheel; a pinion angle detection unit configured to detect a pinion angle based on an operation of the steering wheel; a rear wheel driving unit configured to steer rear wheels; and a control unit configured to receive the vehicle speed, the steering angle, and the pinion angle from the vehicle speed detection unit, the steering angle detection unit, and the pinion angle detection unit, calculate a target rear wheel steering angle for steering the rear wheels, calculate a final rear wheel steering angle at which a steering point of the rear wheels is adjusted using a steering angle speed, the vehicle speed, and the pinion speed, and operate the rear wheel driving unit.

10 Claims, 5 Drawing Sheets

REAR WHEEL STEERING SYSTEM AND CONTROL METHOD THEREOF

CROSS-REFERENCES TO RELATED APPLICATIONS

The present application claims priority to Korean application number 10-2014-0140671, filed on Oct. 17, 2014, which is incorporated by reference in its entirety.

BACKGROUND

The present disclosure relates to a rear wheel steering (RWS) system and a control method thereof.

An AFS (Active Front Steering) system applied to a vehicle includes a motor, a decelerator, and a controller, and actively varies a steering gear ratio of front wheels according to an operation situation of a vehicle, thereby providing drivability and steering operability.

Furthermore, an RWS (Rear Wheel Steering) system includes a motor, a decelerator, and a controller, and steers rear wheels of the vehicle according to the operation state of the vehicle, thereby providing drivability and steering operability.

The related art is disclosed in Korean Patent Laid-open Publication No. 2014-0073262 published on Jun. 16, 2014 and entitled "Behavior control system for vehicle and method thereof".

SUMMARY

Embodiments of the present invention are directed to a rear wheel steering (RWS) system which adjusts a steering point of rear wheels, based on a steering angle and a steering angle speed, such that a driver can quickly feel the response characteristic of a vehicle during sudden steering at a high/middle speed section.

In one embodiment, a rear wheel steering (RWS) system may include: a vehicle speed detection unit configured to detect a vehicle speed; a steering angle detection unit configured to detect a steering angle based on an operation of a steering wheel; a pinion angle detection unit configured to detect a pinion angle based on an operation of the steering wheel; a rear wheel driving unit configured to steer rear wheels; and a control unit configured to receive the vehicle speed, the steering angle, and the pinion angle from the vehicle speed detection unit, the steering angle detection unit, and the pinion angle detection unit, calculate a target rear wheel steering angle for steering the rear wheels, calculate a final rear wheel steering angle at which a steering point of the rear wheels is adjusted, based on a steering angle speed, the vehicle speed, and the pinion speed, and operate the rear wheel driving unit.

The control unit may calculate the steering angle speed from the steering angle, calculate a rear wheel limiting steering angle for limiting the steering point of the rear wheels based on the steering angle speed, the vehicle speed, and the pinion angle, and calculate the final rear wheel steering angle by subtracting the rear wheel limiting steering angle from the target rear wheel steering angle.

The control unit may set a compensating steering angle based on the steering angle speed, and calculate the rear wheel limiting steering angle by multiplying the compensating steering angle by a limiting ratio for each vehicle speed and a limiting ratio for each pinion angle.

The limiting ratio for each vehicle speed may be limited at a preset speed or less, and the limiting ratio for each pinion angle may be limited a preset angle or more.

The control unit may operate the rear wheel driving unit at the target rear wheel steering angle, when steering is returned.

In another embodiment, a control method for an RWS system may include: receiving, by a control unit, a vehicle speed, a steering angle, and a pinion angle from a vehicle speed detection unit, a steering angle detection unit, and a pinion angle detection unit; calculating a target rear wheel steering angle for steering rear wheels based on the steering angle and the vehicle speed; calculating a rear wheel limiting steering angle for limiting a steering point of the rear wheels based on a steering angle speed, the vehicle speed, and the pinion angle; calculating a final rear wheel steering angle from the target rear wheel steering angle and the rear wheel limiting steering angle; and steering the rear wheels based on the final rear wheel steering angle.

In the calculating of the rear wheel limiting steering angle, the control unit may calculate the steering angle speed from the steering angle, set a compensating steering angle based on the steering angle speed, and calculate the rear wheel limiting steering angle by multiplying the compensating steering angle by a limiting ratio for each vehicle speed and a limiting ratio for each pinion angle.

The limiting ratio for each vehicle speed may be limited at a preset speed or less, and the limiting ratio for each pinion angle is limited at a preset angle or more.

The steering of the rear wheel may include operating the rear wheel driving unit at the target rear wheel steering angle when steering is returned.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking embodiments of the invention into account and can be changed according to the custom or intention of users or operators. Therefore, definition of the terms should be made according to the overall disclosures set forth herein.

Generally, a rear wheel steering (RWS) system steers the rear wheels in the opposite direction to the front wheels during low-speed operation, and steers the rear wheels in the same direction as the front wheels during high-speed operation. In this way, the RWS system can reduce a radius of rotation during low-speed operation, and improve steering stability during high-speed operation.

The vehicle having the RWS system mounted therein steers the rear wheels in the same direction as the front wheels during high-speed operation. Thus, while the occurrence of yaws in the vehicle is reduced, a turning trajectory is increased. Therefore, a driver may increase the amount of steering, in order to turn the vehicle at a desired trajectory.

In the vehicle having the RWS system mounted therein, the occurrence of yaws in the vehicle is reduced during sudden steering and evasive steering in middle/high-speed operation. Thus, when the driver does not recognize the response characteristic of the vehicle but conducts excessive steering, another accident may occur.

Figure 1:
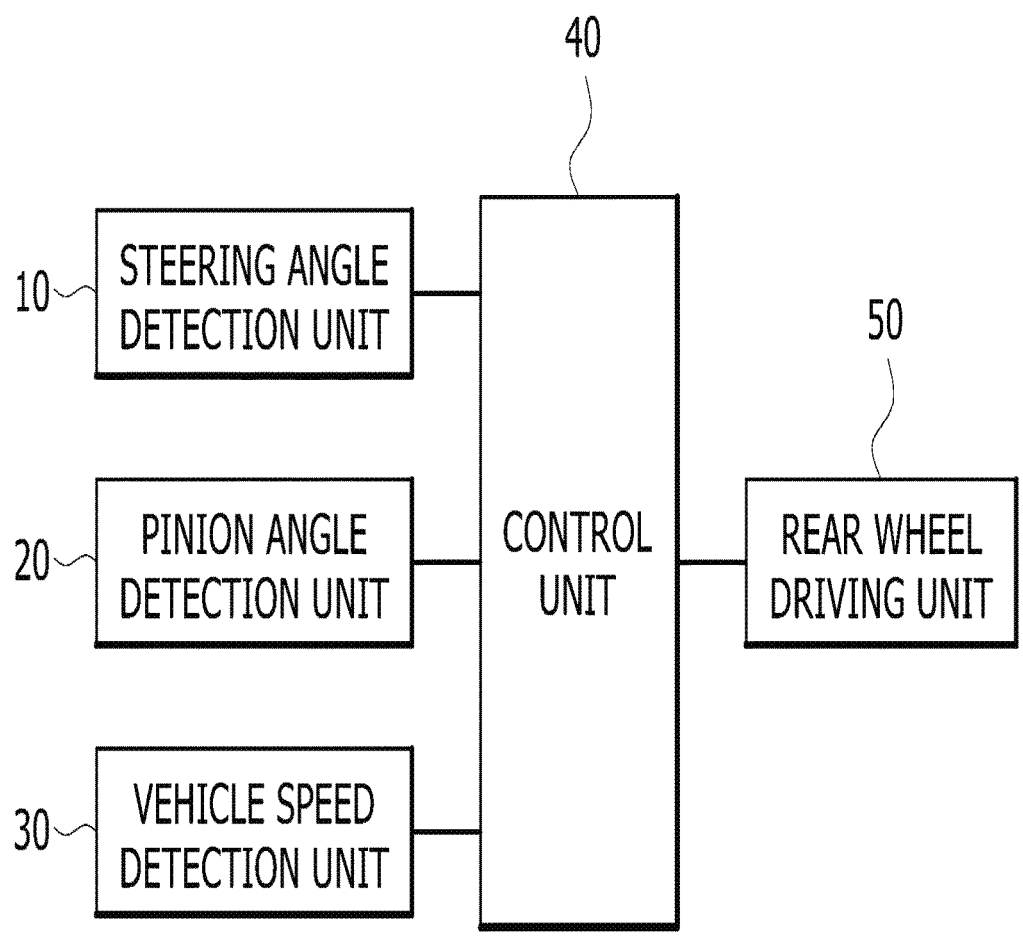
FIG. 1 is a block diagram illustrating a rear wheel steering (RWS) system in accordance with an embodiment of the present invention.
Figure 2A:
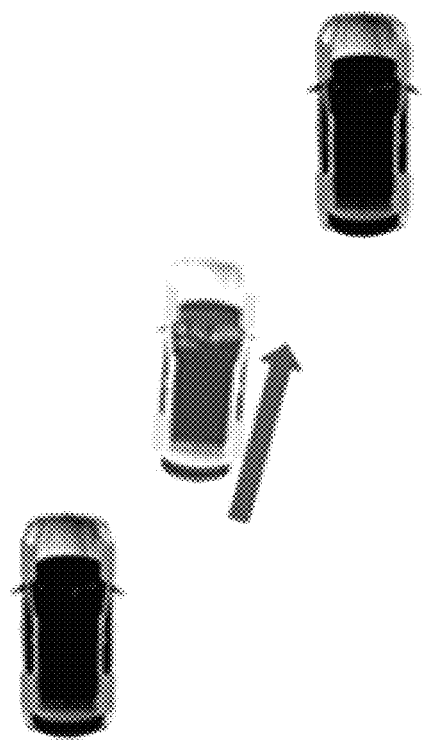
FIGS. 2A and 2B are diagrams illustrating the behavior of a vehicle to which the RWS system in accordance with the embodiment of the present invention is applied.
Figure 2B:
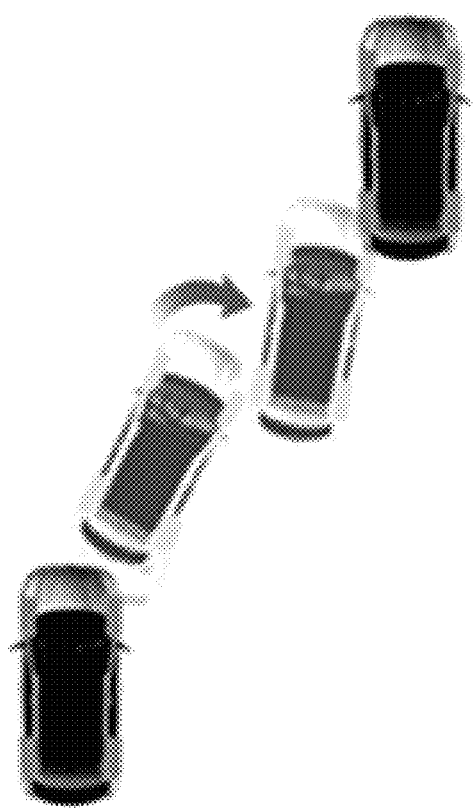
Figure 3:
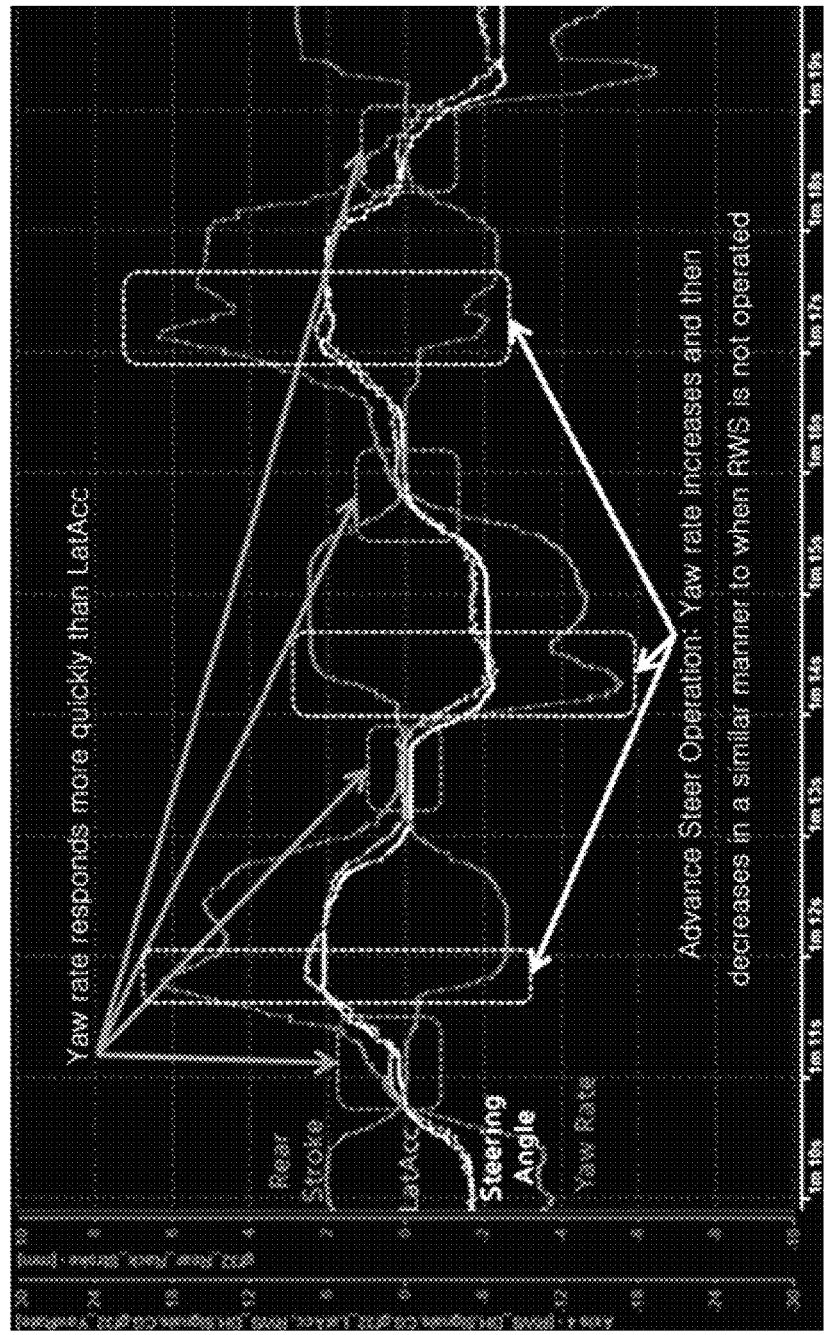
FIG. 3 is a graph illustrating the behavior of the vehicle to which the RWS system in accordance with the embodiment of the present invention is applied.

FIG. 1 is a block diagram illustrating a rear wheel steering (RWS) system in accordance with an embodiment of the present invention. FIGS. 2A and 2B are diagrams illustrating the behavior of a vehicle to which the RWS system in accordance with the embodiment of the present invention is applied. FIG. 3 is a graph illustrating the behavior of the vehicle to which the RWS system in accordance with the embodiment of the present invention is applied.

As illustrated in FIG. 1, the RWS system in accordance with the embodiment of the present invention may include a vehicle speed detection unit 30, a steering angle detection unit 10, a pinion angle detection unit 20, a rear wheel driving unit 50, and a control unit 40.

The vehicle speed detection unit 30 may detect vehicle speed from the number of rotations of an output shaft in a transmission (not illustrated), and provide the detected vehicle speed to the control unit 40.

The steering angle detection unit 10 may detect a steering angle based on an operation of a steering wheel (not illustrated), and provide the detected steering angle to the control unit 40.

The pinion angle detection unit 20 may detect a pinion angle based on an operation of the steering wheel, and provide the detected pinion angle to the control unit 40.

The rear wheel driving unit 50 may steer the rear wheels of the vehicle through a motor and a decelerator which are not illustrated.

The control unit 40 may receive the vehicle speed, the steering angle, and the pinion angle from the vehicle speed detection unit 30, the steering angle detection unit 10, and the pinion angle detection unit 20, calculate a target rear wheel steering angle for steering the rear wheels, calculate a final rear wheel steering angle at which a steering point of the rear wheels is adjusted, based on a steering angular speed, the vehicle speed, and the pinion angle, and operate the rear wheel driving unit 50.

The control unit 40 may calculate the target rear wheel steering angle by applying a rear wheel steering gain based on the vehicle speed and the ratio of the steering angle to the front wheels. At this time, the control unit 40 may calculate the steering angle of the rear wheels in the opposite direction to the front wheels according to the steering angle of the steering wheel during low-speed operation, and calculate the steering angle of the rear wheels in the same direction as the front wheels during high-speed operation.

Furthermore, the control unit 40 may calculate a steering angle speed from the steering angle, set a compensating steering angle based on the steering angle speed, calculate a rear wheel limiting steering angle by multiplying a limiting ratio for each vehicle speed and a limiting ratio for each pinion angle by the compensating steering angle, and calculate the final rear wheel steering angle by subtracting the rear wheel limiting steering angle from the target rear wheel steering angle.

The compensating steering angle may be set to a large angle when the steering angle speed is low, and set to a small angle when the steering angle speed is high.

The RWS system in accordance with the embodiment of the present invention may limit the steering point of the rear wheels at the initial stage of steering, when the vehicle is operated at middle or high speed. When the steering angle speed is high in a state where the vehicle is operated at high speed, yaw may have already occurred. Thus, a limiting value for the occurrence of yaw may be set to a small value. On the other hand, when the steering angle speed is low, the compensating steering angle may be set to a large value such that the response characteristic of the vehicle is increased.

Furthermore, the limiting ratio for each vehicle speed may be limited at a preset speed or less, and the limiting ratio for each pinion angle may be limited at a preset angle or more. For example, at middle/high-speed, for example, at a vehicle speed of 48 km/h or less, the probability of an accident caused by excessive steering is low even though a driver does not quickly feel the response characteristic of the vehicle. Thus, the steering point of the rear wheels may not be adjusted. Furthermore, at a pinion angle of 45 degrees or more, excessive steering is determined to have been performed. Thus, the steering point of the rear wheels may not be adjusted in order to maintain the stability of the vehicle.

The rear wheel limiting steering angle can be calculated by the control unit 40 using a map method.

When steering is returned after steering is performed, the control unit 40 may not apply the rear wheel limiting steering angle, but operate the rear wheel driving unit 50 at the target rear wheel steering angle.

When the control unit 40 does not apply the rear wheel limiting angle but applies the target rear wheel steering angle to steer the rear wheels during sudden steering and evasive steering at middle/high speed as illustrated in FIG. 2A, a driver may not clearly feel the response characteristic of the vehicle because the occurrence of yaws is reduced. However, when the control unit 40 applies the rear limiting steering angle to steer the rear wheels based on the final rear wheel steering angle, yaws may occur at the initial stage as illustrated in FIG. 2B such that the driver can clearly feel the response characteristic of the vehicle. Then, the control unit 40 may steer the rear wheels to maintain the steering stability.

Furthermore, as illustrated in FIG. 3, the yaw rate may respond more quickly than the lateral acceleration LatAcc such that the driver can feel the response characteristic of the vehicle. The yaw rate may increase at the initial stage in which the steering point of the rear wheels is delayed, but then decrease while the rear wheel is steered.

As described above, the RWS system in accordance with the embodiment of the present invention may adjust the steering point of the rear wheels based on the steering angle and the steering angle speed during sudden steering at a middle/high-speed section, such that the driver can quickly feel the response characteristic of the vehicle at the initial stage of sudden steering. Thus, the RWS system can improve the steering feeling while maintaining the stability of the vehicle, thereby preventing excessive steering.

Figure 4:
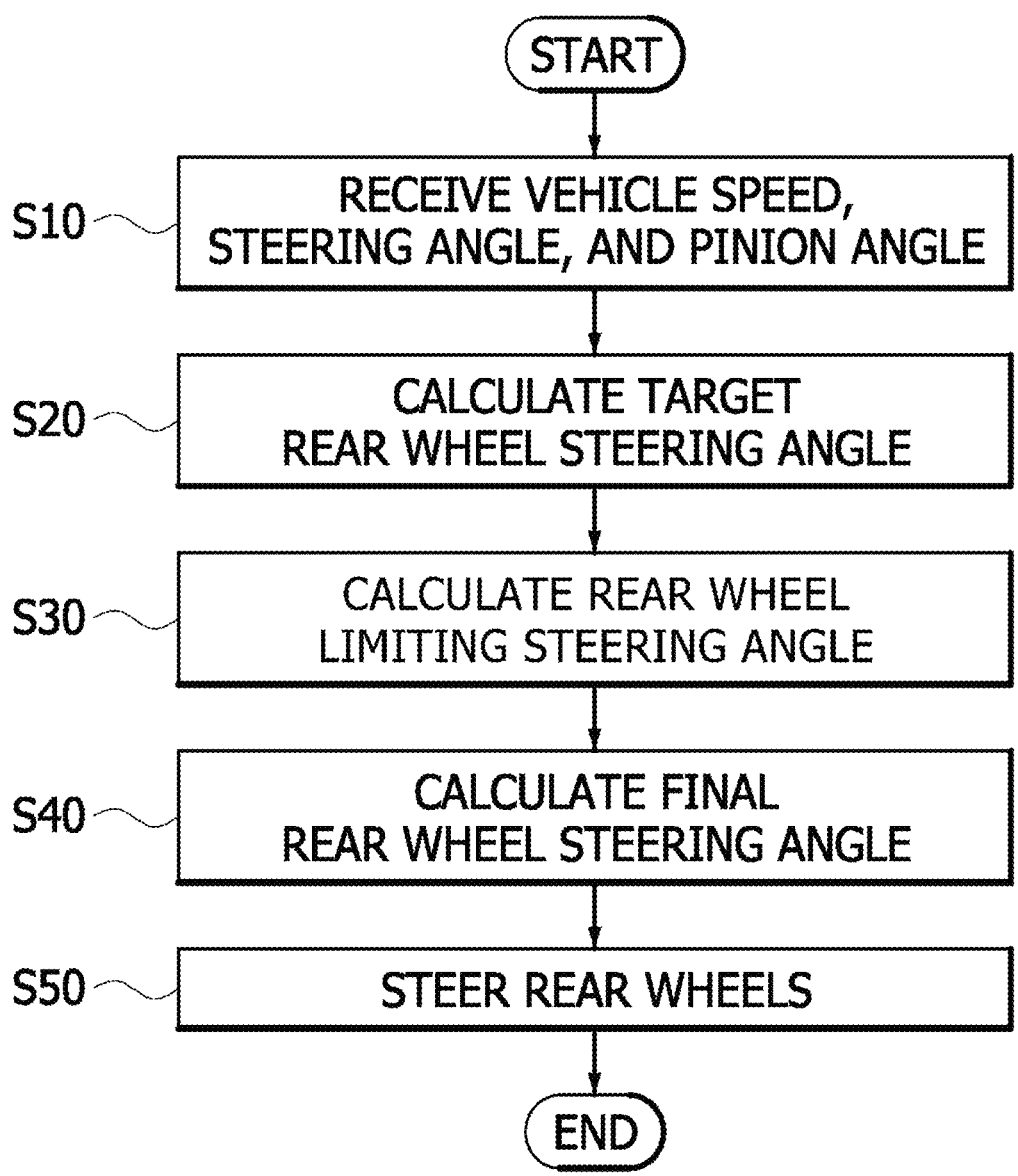
FIG. 4 is a flowchart for describing a control method of an RWS system in accordance with an embodiment of the present invention.

FIG. 4 is a flowchart for describing a control method of an RWS system in accordance with an embodiment of the present invention.

The control method of the RWS system in accordance with the embodiment of the present invention will be described with reference to FIG. 4. First, the control unit 40 may receive a vehicle speed, a steering angle, and a pinion angle from the vehicle speed detection unit 30, the steering angle detection unit 10, and the pinion angle detection unit 20 at step S10.

Then, the control unit 40 may calculate a target rear wheel steering angle for steering the rear wheels, based on the steering angle and the vehicle speed, at step S20.

The control unit 40 may calculate the target rear wheel steering angle by applying a rear wheel steering gain based on the vehicle speed and the ratio of the steering angle to the front wheels. At this time, the control unit 40 may calculate the steering angle of the rear wheels in the opposite direction to the front wheels according to the steering angle of the steering wheel during low-speed operation, and calculate the steering angle of the rear wheels in the same direction as the front wheels during high-speed operation.

After calculating the target rear wheel steering angle, the control unit 40 may calculate a rear wheel limiting steering angle for limiting the steering point of the rear wheels, based on a steering angle speed, the vehicle speed, and the pinion angle, at step S30.

At this time, the rear wheel limiting steering angle may be calculated by the control unit using a map method.

As described above, the control unit 40 may calculate the steering angle speed from the steering angle, set a compensating steering angle based on the steering angle speed, and calculate the rear wheel limiting steering angle by multiplying the compensating steering angle by a limiting ratio for each vehicle speed and a limiting ratio for each pinion angle.

The compensating steering angle may be set to a large angle when the steering angle speed is low, and set to a small angle when the steering angle speed is high.

In the present embodiment, the steering point of the rear wheels may be limited at the initial stage of steering, when the vehicle is operated at middle/high speed. When the steering angle speed is high in a state where the vehicle is operated at high speed, yaws may have already occurred. Thus, a limiting value for the occurrence of yaws may be set to a small value. On the other hand, when the steering angle speed is low, the compensating steering angle may be set to a large value such that the response characteristic of the vehicle is increased.

Furthermore, the limiting ratio for each vehicle speed may be limited at a preset speed or less, and the limiting ratio for each pinion angle may be limited at a preset angle or more. For example, at middle/high-speed, for example, at a vehicle speed of 48 km/h or less, the probability of an accident caused by excessive steering is low even though a driver does not quickly feel the response characteristic of the vehicle. Thus, the steering point of the rear wheels may not be adjusted. Furthermore, at a pinion angle of 45 degrees or more, excessive steering is determined to have been performed. Thus, the steering point of the rear wheels may not be adjusted in order to maintain the stability of the vehicle.

After calculating the rear wheel limiting steering angle, the control unit 40 may calculate a final rear wheel steering angle by subtracting the rear wheel limiting steering angle from the target rear wheel steering angle, at step S40.

Then, the control unit 40 may steer the rear wheels based on the final rear wheel steering angle at step S50.

During sudden steering and evasive steering at middle/high speed, the control unit 40 may apply the rear wheel limiting steering angle from the calculated target rear wheel steering angle, and limit the steering point of the rear wheels at the initial stage of the steering operation. Thus, the driver can reliably feel the response characteristic of the vehicle.

When steering is returned after steering is performed, the control unit 40 may not apply the rear wheel limiting steering angle, but operate the rear wheel driving unit 50 at the target rear wheel steering angle.

As described above, the control method of the RWS system in accordance with the embodiment of the present invention may adjust the steering point of the rear wheels based on the steering angle and the steering angle speed during sudden steering at a middle/high-speed section, such that the driver can quickly feel the response characteristic of the vehicle at the initial stage of sudden steering. Thus, the control method can improve the steering feeling while maintaining the stability of the vehicle, thereby preventing excessive steering.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering system comprising:
   a vehicle speed detector configured to detect a vehicle speed;
   a steering angle detector configured to detect a steering angle based on an operation of a steering wheel;
   a pinion angle detector configured to detect a pinion angle based on an operation of the steering wheel; and
   a controller configured to:
   receive a vehicle speed from the vehicle speed detector, a steering angle from the steering angle detector, and a pinion angle from the pinion angle detector,
   calculate a target rear wheel steering angle based on the steering angle and the vehicle speed, and
   calculate a final rear wheel steering angle at which a steering point of rear wheels is adjusted based on the target rear wheel steering angle, a steering angle speed, the vehicle speed, and the pinion angle for steering the rear wheels.

2. The steering system of claim 1, wherein the controller is further configured to:
   calculate the steering angle speed from the steering angle,
   calculate a rear wheel limiting steering angle for limiting the steering point of the rear wheels based on the steering angle speed, the vehicle speed, and the pinion angle, and
   calculate the final rear wheel steering angle by subtracting the rear wheel limiting steering angle from the target rear wheel steering angle.

3. The steering system of claim 2, wherein the controller is further configured to:
   seta compensating steering angle based on the steering angle speed, and
   calculate the rear wheel limiting steering angle by multiplying the compensating steering angle by a limiting ratio for the vehicle speed and a limiting ratio for the pinion angle.

4. The steering system of claim 3, wherein the limiting ratio for the vehicle speed is limited at a preset speed or less, and the limiting ratio for the pinion angle is limited a preset angle or more.

5. The steering system of claim 1, wherein the controller is configured to cause to steer the rear wheels based on the target rear wheel steering angle when steering is returned.

6. A control method for an steering system, comprising:
   receiving a vehicle speed, a steering angle, and a pinion angle;

calculating a target rear wheel steering angle based on the steering angle and the vehicle speed;

calculating a rear wheel limiting steering angle for limiting a steering point of rear wheels based on a steering angle speed, the vehicle speed, and the pinion angle;

calculating a final rear wheel steering angle from the target rear wheel steering angle and the rear wheel limiting steering angle; and steering the rear wheels based on the final rear wheel steering angle.

7. The control method of claim 6, wherein calculating the rear wheel limiting steering angle comprises:

calculating the steering angle speed from the steering angle, setting a compensating steering angle based on the steering angle speed, and calculating the rear wheel limiting steering angle by multiplying the compensating steering angle by a limiting ratio for the vehicle speed and a limiting ratio for the pinion angle.

8. The control method of claim 7, wherein the final rear wheel steering angle is calculated by subtracting the rear wheel limiting steering angle from the target rear wheel steering angle.

9. The control method of claim 8, wherein the limiting ratio for the vehicle speed is limited at a preset speed or less, and the limiting ratio for the pinion angle is limited at a preset angle or more.

10. The control method of claim 6, wherein the rear wheels are steered at the target rear wheel steering angle when steering is returned.

* * * * *